US007958552B2

(12) United States Patent
Arnold et al.

(10) Patent No.: US 7,958,552 B2
(45) Date of Patent: Jun. 7, 2011

(54) SYSTEM TO ESTABLISH TRUST BETWEEN POLICY SYSTEMS AND USERS

(75) Inventors: William C. Arnold, Mahopac, NY (US); Hoi Yeung Chan, Stamford, CT (US); Alla Segal, Mount Kisco, NY (US); Ian N. Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/545,167

(22) Filed: Aug. 21, 2009

(65) Prior Publication Data

US 2009/0307747 A1 Dec. 10, 2009

Related U.S. Application Data

(63) Continuation of application No. 11/145,775, filed on Jun. 6, 2005, now abandoned.

(60) Provisional application No. 60/686,471, filed on Jun. 1, 2005.

(51) Int. Cl.
*G06F 21/00* (2006.01)

(52) U.S. Cl. .............. 726/17; 726/1; 713/164; 713/165; 713/166

(58) Field of Classification Search ................ 726/1, 22, 726/17; 713/164–166
See application file for complete search history.

(56) References Cited

U.S. PATENT DOCUMENTS

| 6,052,723 | A | 4/2000 | Ginn |
| 6,088,801 | A | 7/2000 | Grecsek |
| 6,654,732 | B1 * | 11/2003 | Naito et al. ............... 706/45 |
| 6,785,728 | B1 | 8/2004 | Schneider et al. |
| 6,854,016 | B1 | 2/2005 | Kraenzel et al. |
| 7,086,085 | B1 | 8/2006 | Brown et al. |
| 7,233,935 | B1 | 6/2007 | Chandler |
| 2002/0026576 | A1 | 2/2002 | Das-Purkayastha et al. |
| 2005/0044209 | A1 * | 2/2005 | Doyle et al. ............... 709/224 |
| 2005/0210448 | A1 | 9/2005 | Kipman et al. |
| 2006/0168022 | A1 | 7/2006 | Levin et al. |

OTHER PUBLICATIONS

S. Marsh, "Trust and Reliance in Multi-Agent Systems: a preliminary report", (MAAMAW'92), Rome, Italy, 1992.
S. Marsh, Formalizing Trust as a Computation Concept, PhD Thesis, Dept. of Mathematics and Computer Sciences, U. of Stirling, UK, 1994.

(Continued)

*Primary Examiner* — Minh Dinh
*Assistant Examiner* — Virginia Ho
(74) *Attorney, Agent, or Firm* — George Willinghan; August Law, LLC (57) ABSTRACT

A system and method are provided to establish trust between a user and a policy system that generates recommended actions in accordance with specified policies. Trust is introduced into the policy-based system by assigning a value to each execution of each policy with respect to the policy-based system, called the instantaneous trust index. The instantaneous trust indices for each one of the policies, for the each execution of a given policy or for both are combined into the overall trust index for a given policy or for a given policy-based system. The recommended actions are processed in accordance with the level or trust associated with a given policy as expressed by the trust indices. Manual user input is provided to monitor or change the recommended actions. In addition, reinforcement learning algorithms are used to further enhance the level of trust between the user and the policy-based system.

20 Claims, 4 Drawing Sheets

OTHER PUBLICATIONS

P. Horn, "Autonomic Computing: IBM's Perspective on the State of Information Technology", IBM Corporation, http://www.rsearch.ibm.com/autonomic/manifesto, Oct. 2001.

J.O. Kephart and D.M. Chess, "The Vision of Autonomic Computing", IEEE Computer Magazine, Jan. 2003.

J.O. Kephart and W.E. Walsh, "An Artificial Intelligence Perspective on Autonomic Computing Policies", Policies for Distributed Systems and Networks, 2004.

L.P. Kaelbling, M. Littman, A. Moore, "Reinforcement Learning: A Survey", Journal of Artificial Intelligence Research, vol. 4, 1996.

T. Yu and M. Winslett, "A Unified Scheme for Resource Protection in Automated Trust Negotiation", Proceedings of the 2003 IEEE Symposium on Security and Privacy.

R. Anderson, "Cryptography and Competition Policy—Issues with 'Trusted Computing'", PODC'03, Jul. 13-16, 2003.

T. Tang, P. Winoto and X. Niu, "Who Can I Trust? Investigating Trust Between Users and Agents in a Multi-Agent Portfolio Management System", The University of Saskatchewan.

M. Lewis, "Designing for Human-Agent Interaction", School of Information Sciences, University of Pittsburgh.

R. Parasuraman, "Designing Automation for Human Use: Emperical Studies and Quantitative Models", The Catholic University of America (2000).

M. Itoh, G. Abe and K. Tanaka, "Trust in and Use of Automation: Their Dependence on Occurrence Patterns of Malfunctions", IEEE (1999).

P. Madhaven and D. Wiegman, "A New Look at the Dynamics of Human-Automation Trust: Is Trust in Humans Comparable to Trust in Machines?", Human Factors & Ergonomics Society (2004).

C. Jonker and J. Treur, "Formal Analysis of Models for the Dynamics of Trust Based on Experiences", Vrije Universiteit Amsterdam, The Netherlands.

M. Schillo, P. Funk and M. Rovatsos, "Using Trust for Detecting Deceitful Agents in Artificial Societies", Applied Artificial Intelligence Journal (2000).

G. Elofson, "Developing Trust with Intelligent Agents: an Exploratory Study", Proceedings of 1st International Workshops on Trust, 1998.

E. Kandogan, P. Maglio, "Why Don't You Trust Me Anymore? Or the Role of Trust in Troubleshooting Activity of System Adminstrators", CHI 2003 Conference.

A.K. Bandara, "A Goal-based Approach to Policy Refinement", Proceedings 5th IEEE Workshop on Policies for Distributed Systems & Networks (Policy 2004).

S. Marsh, "Trust in Distributed Artificial Intelligence", Artificial Social Systems, LNAI 830, Springer-Verlag, 94-112.

R. Barrett, "People and Policies: Transforming the Human-Computer Partnership", Proceedings of the Fifth IEEE International Workshop on Policies for Distributed Systems and Networks (Policy 2004).

* cited by examiner

SYSTEM TO ESTABLISH TRUST BETWEEN POLICY SYSTEMS AND USERS

CROSS REFERENCE TO RELATED APPLICATIONS

The present application is a Continuation of U.S. patent application Ser. No. 11/145,775 filed Jun. 6, 2005, which, pursuant to 35 U.S.C. §119(e), claimed priority to provisional application No. 60/686,471 filed Jun. 1, 2005. The entire disclosures of both of these applications are incorporated herein by reference.

FIELD OF THE INVENTION

The present invention relates to policy-based computing systems.

BACKGROUND OF THE INVENTION

The use of business rules and policies to externalize business and operational logic from an application is an important concept and approach to building large business applications and to new areas such as self-managing systems or autonomic computing systems. Business rules and policies are statements that are intended to be readable and modifiable by non-technical users and executable by an underlying mechanism such as a rule engine or a Java Virtual Machine (JVM), allowing application logic to be authored and modified external to the application.

One of the key aspects of using these business rules or policies is the ability to specify a priority for each of the rules in a set of business rules. A business rule set is a collection of rules selected and arranged to achieve a desired goal. Assigning a priority to each rule contained in the rule set controls the sequence of execution of those rules in the rule set. Typically, priorities are initially established and assigned by a rule author; however, priority of the rules can be subsequently modified in accordance with application specific parameters, i.e. different situations and execution environments.

The use of policy-based systems has become increasingly common. For example, the emerging areas of autonomic and on demand computing are accelerating the adoption of policy-based systems. As the requirements on policy-based systems become more complex, traditional approaches to the implementation of such systems, for example relying entirely on simple "if [condition] then [actions]" rules, become insufficient. New approaches to the design and implementation of policy-based systems have emerged, including goal policies, utility functions, data mining, reinforcement learning and planning.

One issue regarding the use or implementation of policy-based systems is establishing the same level of trust among users and system administrators for policy-based systems as exists for traditional systems. Unless policy-based systems are trusted at least as much as traditional systems, increases in the acceptance level of policy-based systems will be hindered. In addition, a system administrator needs to know that a policy-based system will help the administrator's system perform better. Unfortunately, current approaches to the design and implementation of policy-based systems do nothing to reduce administrators' skepticism towards policy-based automation.

In general, trust can be viewed as an abstract concept that involves a complex combination of fundamental qualities such as reliability, competence, dependability, confidence and integrity. Research has been conducted in the area of multi-agent systems on the concept of trust. In this research, trust is defined quantitatively as the level of dependability and competence associated with a given software agent as compared to other similar software agents. As policy-based systems evolved from the use of relatively simple "if/then" rules to more sophisticated and powerful components that utilize goals and utility function policies, data mining and reinforcement learning among others, the level of trust associated with a given policy-based system has become an important factor in determining the use of that policy-based system as an integral part of overall systems management. Information Technology (IT) managers are likely to be hesitant to trust an autonomous policy-based system to run the entire IT operations without first establishing a certain level of trust in that autonomous policy-based system. Therefore, trust between a policy-based system and the users of that system is needed to encourage adoption and implementation of a given policy-based system.

Current issues regarding trust in policy-based systems have concentrated on user interface issues. In R. Barrett, *People and Policies*, Policies for Distributed Systems and Networks (2004), the necessity of gaining a user's trust is discussed as are ways to make policy-based systems trustworthy. E. Kandogan and P. Maglio, *Why Don't You Trust Me Anymore? Or the Role of Trust in Troubleshooting Activity of System Administrators*, Conference on Human Computer Interaction (2003), addresses the role of trust in the work of system administrators. Again, the majority of this work focuses on user interface matters, rather than on the design and operation of the system itself. Very few studies have been conducted on the issue of trust between users and software systems where the actions of the software systems are determined via prescribed policies or other autonomous mechanisms. In addition, no general tools are available that allow a policy system to earn a user's trust.

SUMMARY OF THE INVENTION

The present invention is directed to systems and methods that provide for the establishment of trust between a user and a policy based system. Instead of earning trust over a lengthy period of positive user experiences, a systematic approach is used where trust is established gradually through a mix of operation strategies with user interaction and feedback learning.

The concept of "trust" is introduced into the policy-based system by assigning a value to each execution of each policy with respect to the policy-based system. This value is called the instantaneous trust index (ITI). Each policy-based system can contain a number of separate policies, and each policy in the policy-based system has an associated ITI. In addition, an ITI is generated for each execution of a given policy within the policy based system. The ITI's for each one of a plurality of policies, for each execution of a given policy or for both are combined into the overall trust index (OTI) for a given policy or for a given policy-based system. The OTI for a policy or policy-based system reflects the level of trust that a user, for example an administrator with expert domain knowledge, has in a particular policy or group of policies. The established OTI is can be included associated with the policy, for example as a parameter included with each policy; therefore, the user can examine the OTI when selecting a policy to be used. For example, the user can select the policy having the highest trust level, i.e. OTI, from among a group of policies.

Suitable methods for computing the ITI include, for example, examining what fraction of actions suggested from the execution of a particular policy rule the user accepts unchanged or by examining the extent to which the user changes or modifies the suggested actions. In addition, reinforcement learning techniques are used in combination with the ITI and OTI so that a given policy or policy-based system can adjust its behavior to maximum its trust index, i.e. to increase the trust of the user.

DETAILED DESCRIPTION

Figure 1:
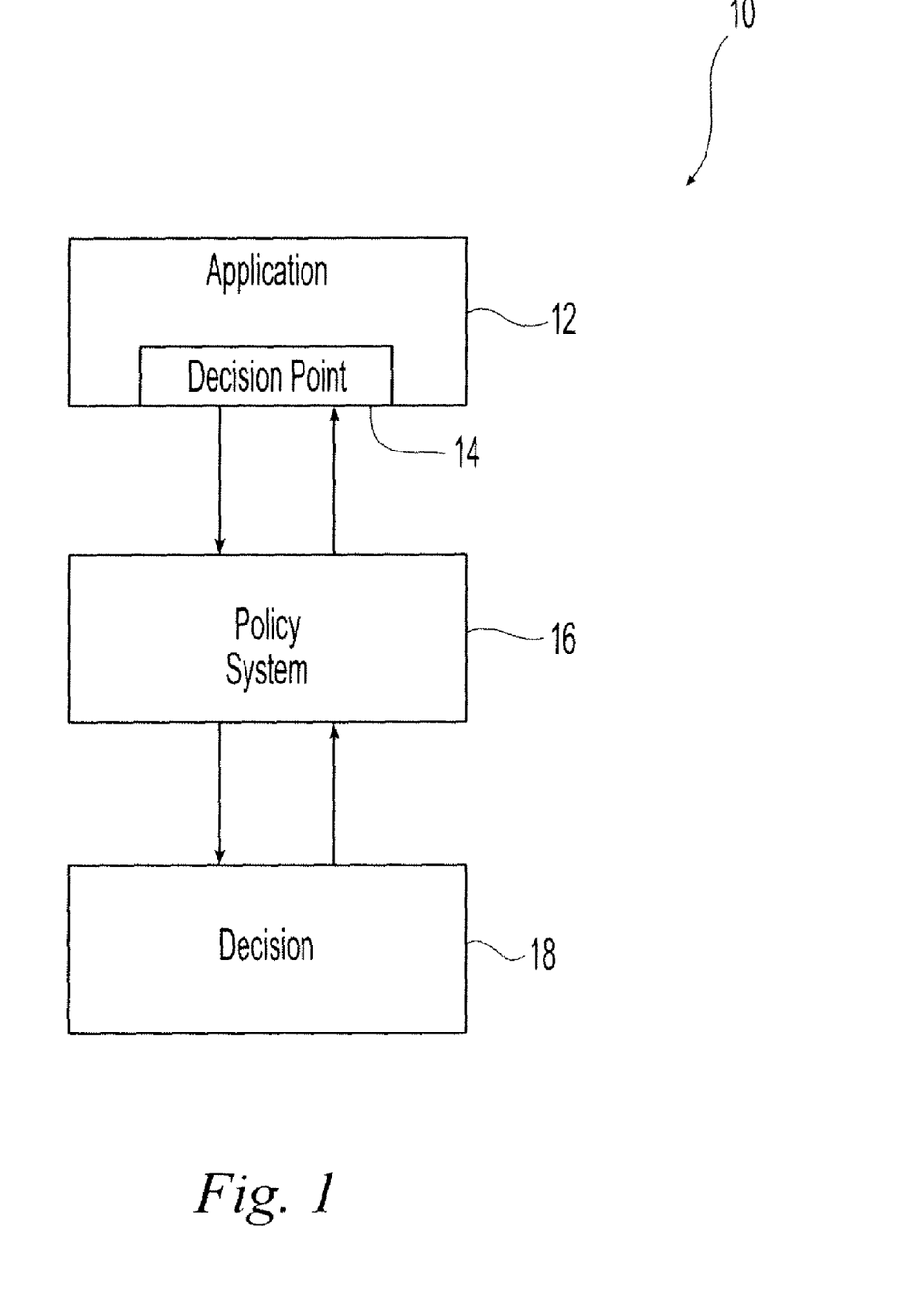
FIG. 1 is a block diagram representation of a policy system for use with the present invention.

Referring initially to FIG. 1, an exemplary embodiment of a policy or policy-based system for use with trust building tools 10 in accordance with the present invention is illustrated. As illustrated an application 12 is interfaced with a policy implementation and enforcement system 16 that provides for the automated implementation of rules and policies to control or to modify the application. The policy system monitors decision points 14 within the application and uses these decision points to develop decisions 18 regarding actions to be taken within the application to implement predetermined and user-inputted policies contained within the policy system. A user or system administrator is responsible for the operation of the application. However, implementation of the actions decided upon by the policy system affect the operation of the application, and the policy system is constructed to operate autonomously and without the need for user input or oversight. Therefore, the responsible user or administrator is responsible for the actions implemented by the policy system, requiring the user to trust the policy system to develop and implement actions that will benefit the application. Suitable users include any user of policy-based systems including system administrators and persons with expert domain knowledge. This trust between the user and the policy-based system is established by coupling a decision-modifying trust component to the policy-based system.

In one exemplary embodiment in accordance with the present invention, at least one policy, for example from a policy-based system containing a plurality of policies, that is capable of governing operational aspects of the application that is being controlled by the policy-based system is identified. Alternatively, a plurality of policies is identified, and each identified policy is capable of governing operational aspects of the application.

Methods in accordance with the present invention introduce an aspect of trust that is associated with using that identified policy to govern the operational aspects of the application. In one embodiment, trust is an expression of the level of trust that a user or system administrator that is responsible for the operation of the application has in the policy. In one embodiment, trust is introduced into a policy-based system by determining the level of trust, i.e. user trust, associated with using the identified policy to govern the operational aspects of the application. In one embodiment, the level of trust is determined with user-defined criteria. Suitable user-defined criteria include, but are not limited to, reliability of the policy and dependability of the policy.

Since a given policy can be repeatedly used or applied, a new level of trust is determined for the policy upon each use of the application to govern the operational aspects of the application. All of these separate levels of trust for the same policy can be combined or aggregated into an overall trust level. For example, an instantaneous trust index (ITI) is assigned to each execution of each policy with respect to a policy-based system. For a single given policy, the ITI associated with each execution is combined into an overall trust index (OTI) for that policy, for example by averaging the ITI's over a period of time.

When a plurality of policies is identified, a level of trust is determined for each identified policy in the plurality of policies. The level of trust for each one of the identified polices is then combined into an overall trust level. For example, the ITI associated with each policy for a plurality of policies in a given policy-based system are combined into an OTI for that policy-based system. Therefore, the OTI is an expression of the level of trust that a given user has in a particular policy or group of policies for a given occurrence or application of the plurality of policies. In one embodiment, the determined level of trust is associated with the identified policy and used as a parameter by the user or system administrator in determining when to select and use the policy, i.e. the level of trust is used like a priority in the policy-based system.

Having determined the level of trust associated with the policy or group of policies, this determined level of trust is used to select an operational trust state that defines the level of autonomy with which the policy-based system operates to govern the operational states of the application. An increased level of trust corresponds to an increased level of autonomy, and a decreased level of trust corresponds to a lower level of autonomy. The level of trust can be the level of trust associated with a single occurrence of a single policy, the overall trust level associated with multiple occurrences of a single policy or the overall trust level associated with the use of multiple policies. In one embodiment, the operational trust level controls the amount of input or interaction a user provides during implementation of the policy. For example, the operational trust state can be selected from among a plurality of operational trust states. These operational trust states include, but are not limited to, a fully supervised trust state, a partially modifiable trust state and an unsupervised, full trust state.

Although an initial operational trust state is determined, this operational trust state can be varied over time in response to changes in the level of trust associated with a given policy. In one embodiment, the selected operational trust state is increased in response to an increase in the level of trust. Conversely, the selected operational trust state is decreased in response to a decrease in the level of trust. In one embodiment, a given determined level of trust is associated with a particular operating mode of the policy-based system. Suitable operating modes include automatic modes and manual modes. The level of trust is changed by changing the operating mode.

Policies are implemented in the application by creating recommended actions that affect the operating conditions of the application to be consistent with the policies. In one embodiment, at least one policy recommended action is identified to affect the operational aspects of the application upon implementation. In another embodiment, a plurality of policy recommended actions is identified. These recommended actions can be implemented as recommended, not implement or modified prior to implementation. In one embodiment, the disposition or modification of the recommended actions, including the quantity and quality of any modifications is taken into account when calculating a level of trust associated with the policy that produced the recommended actions. In one embodiment, the identified modifications are used to calculate the ITI. Methods for computing the ITI include, for example, calculating the fraction of actions suggested from the execution of a particular policy rule that are actually accepted and implemented by the user unchanged. In another embodiment, any changes made by the user to the suggested actions of the policy rule are examined, and a value or weight is assigned that correlates to the extensiveness of the changes or the relationship between the action as suggested and the action as implemented. In another embodiment, a value or weight is assigned to any suggested action of the policy that is completely disregarded by the user.

In one embodiment, ITI takes into account modifications of policy recommended actions by the user and is expressed by the equation $ITI=f(m^1, m^2, \ldots, m^n)$ where $m^1, m^2, \ldots, m^n$ are weights assigned to each on of n different user modifications. The function $ITI=f(m^1, m^2, \ldots, m^n)$ is normalized such that $0 \leq ITI \leq 1$.

In one embodiment, the corresponding OTI for this user-modification based ITI is expressed by the equation $OTI=f_1(ITI^1, ITI^2, \ldots, ITI^k)$ where $ITI^1, ITI^2, \ldots, ITI^k$ are the ITI's associated with each one of a plurality, k, executions of a given policy. In one embodiment, $f_1()$ represents a moving or historical average and is normalized such that $0 \leq OTI \leq 1$.

In one embodiment for a group of policies G, OTI(G) is represented as a weighted average of the OTI's for each policy that is a member of the group of policies G. This weighted average is represented as $OTI(G)=(w^1 OTI^1 + w^2 OTI^2 + \ldots + w^l OTI^l)/l$, where $w^x$ is the weight assigned to each member policy in the group G containing l different polices and is normalized such that $0 \leq OTI(G) \leq 1$.

In one embodiment trust, either ITI or OTI is represented as a number between 0 and 1. Alternatively, trust is defined as an aggregate of its individual attributes, for example reliability, competence and dependability. These attributes can be user-defined. Each of these attributes is measured individually due to different application requirements. Important information could potentially be lost if these various aspects are combined or reduced into a single scalar quantity. In addition, if the number of users and policies involved exceeds a certain threshold, interactions among the various aspects can be difficult to coordinate.

Figure 2:
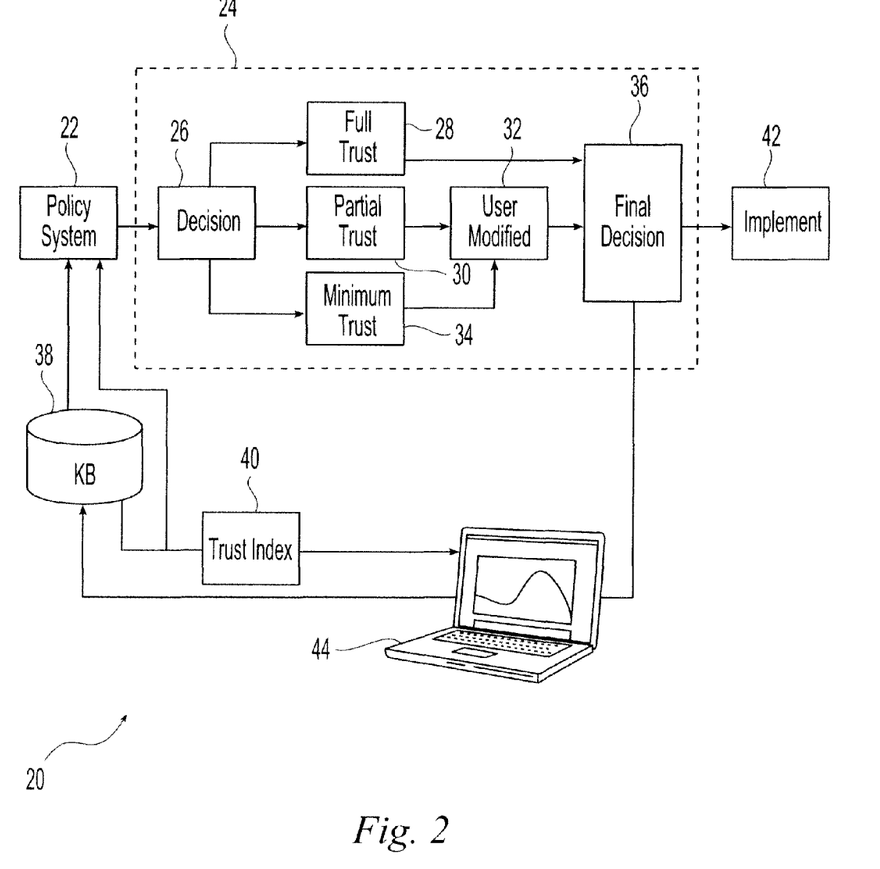
FIG. 2 is a block diagram representation of an embodiment of a combination policy system and trust component in accordance with the present invention.

An exemplary embodiment of a policy system in combination a trust component 20 in accordance with the present invention is illustrated in FIG. 2. The combination policy system and trust building tools includes a policy system 22 in combination with a decision-modifying trust component 24. Suitable policy systems include any type of policy system known and available in the art. For example, the policy system enforces policies and business rules in accordance with a pre-determined ranking system.

The decision-modifying trust component provides the calculation and application of ITI and OTI with respect to a given policy or group of policies applied by the policy system. The decision-modifying trust component includes an initial trust decision 26 for each policy or group of policies that are assigned an OTI. In one embodiment, the initial trust decision is performed automatically based upon an associated ITI or OTI. Alternatively, the initial decision is performed manually by the user by placing the system into a desired trust mode at will on a per-policy basis. Whether the initial decision is performed automatically or manually, the combined system is placed into one of a plurality of trust modes. As illustrated, three different trust modes are possible, minimal trust or supervised mode 34, partial trust or modify mode 30, and full trust or automatic mode 28. Although illustrated with three trust level modes, systems in accordance with the present invention can have more or less than three trust modes. Having more than three trust modes provides greater fine tuning of the desired trust mode. The selected trust mode determines how the actions chosen by the policy system are executed.

In the full trust mode 28, the actions recommended by the policy system pass through to a final decision 36 without active input or modification from the user or system administrator. The final decision then implements those actions 42. In the minimum trust mode 24 and the partial trust mode 30, user modifications 32 are made to the actions recommended by the policy system, and the modified actions are forwarded to the final decision 36 system for implementation as modified. In addition, the final decision system 36 reports the details of any changes or modifications to the recommended actions, together with the conditions under which such modifications were made, to a knowledge base (KB) 38 in communication with the final decision system 36. The modifications and conditions are recorded by the KB, and the KB uses these data to generate and update the appropriate ITI's and OTI's, which are stored in a trust index database 40. In one embodiment, the KB also uses reinforcement learning algorithms to adjust the behavior of a given policy or set of policies to maximize the ITI or OTI. In one embodiment, a trust weighted value is assigned to each policy recommended action to maximize the likelihood of the policy being accepted by a user and to increase the overall trust level of the policy-based system. Therefore, the policy system 22 modifies its behavior so as to increase the level of user trust in that policy system.

The trust index database 40 is also in communication with the policy system. Therefore, for a given policy or set of polices the policy system creates subsequent policy-recommended actions having increased trust, preferably causing subsequent actions to progress up through the trust modes from minimum trust to full trust. In addition a monitoring system 44 for example a computer is provided to allow user monitoring and control of the system 20. In one embodiment, the monitoring system is used to display the determined level of trust for a given policy. The displayed level of trust is utilized by the user or administrator in selecting a given policy for use in governing the operational aspects of the application.

In one embodiment for new users or new policy systems, the policy-recommended actions will initially be handled in the minimum trust mode, because no trust has been established or built-up between the policy system and the user. In the minimum trust mode, the policy-based system 22 uses the prescribed policies to generate recommended actions. These actions, however, are not automatically executed. Instead, the user examines and reviews the recommended actions, for example using the monitoring system 44. The user can accept the recommended actions as recommended, propose modifications to the recommended actions, ignore the recommended actions and propose a separate set of actions or decide not to implement any actions.

Given the user defined modifications or disposition of the recommended actions, a level of trust value is assigned to the policy execution. For example, if for the execution of a given policy, the policy system recommended actions are accepted without modification, then the highest trust value is associated with that execution of the policy. For example, an ITI of 1 is assigned for this policy execution. Conversely, an ITI of 0 is assigned for the current policy execution if either all policy system-recommended actions are ignored by the user and completely replaced by the user-defined actions or no actions are implemented by the user. Otherwise, an ITI is assigned to the current policy execution as specified by a pre-determined function of the amount of modification. This function takes into account parameters that describe the quality and quantity of the modifications including the number of modifications, type of modifications and extent of modifications. The functions can express linear or higher order relationships between the modifications and the assigned ITI value. In addition to evaluating the type and quantity of the modifications, user provided explanation of the modifications can be provided and considered in determining and appropriate ITI.

Therefore, for a given policy, the combination policy-based system and trust component works to increase the ITI of each policy so that the overall OTI for the given operational trust mode evolves toward the highest level of trust, which is represent by the OTI value of about 1. Having approached the highest trust level value, the operational trust mode of the system is elevated to the next level either manually by the user or automatically for a given policy. For example, the operational trust mode can be elevated from minimum trust to partial trust. However, at this new higher level trust mode, the level of trust in any given policy is relatively low, because there is no historical record or experience in operating the policy at the higher and more relaxed trust mode. Therefore, the ITI associated with the next policy is adjusted to express this relatively minimum level of trust in the policy in the current trust mode. In one embodiment, the ITI is set at about 0.

Figure 3:
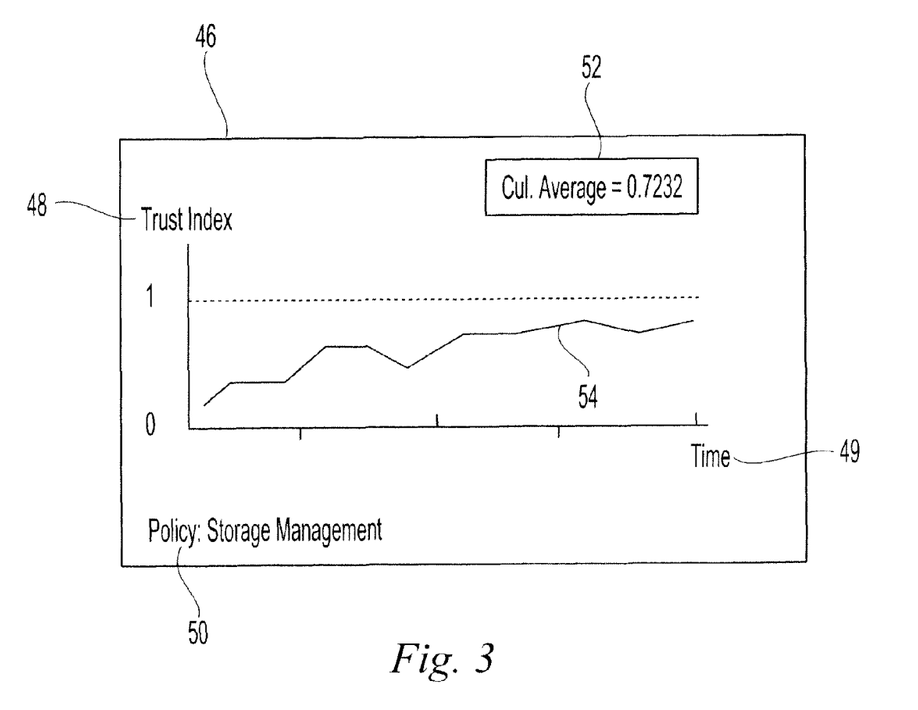
FIG. 3 is a graph illustrating the trust index of a given policy over time.

Referring to FIG. 3, graphical illustration 46 of the trust index 48, i.e. ITI, versus time 49 is illustrated for a given policy 50 is illustrated. The graphical illustration provides a graphical history of ITI over time for a particular policy, illustrating the long-term trust pattern of a policy. The ITI varies overtime between about 0 and about 1, which are the defined boundaries for the functions that express the trust index. The plot 54 increases over time as the level of trust increases for the policy at a given trust mode. When the trust mode is changed or increased there is an associate decrease in trust index. The general trend, however, is for the trust index value to increase over time towards the value of 1.

In the partial trust mode, user modifications to the policy-recommended actions are mode. In one embodiment, unlike the modifications made in the minimal trust mode, user modifications of the recommended actions when in the partial trust mode are limited. In one embodiment, the recommended actions themselves cannot be modified or deleted by the user, and only the parameters to those actions can be modified. At this trust mode, since the actions themselves are not modified, review and adjustment of the recommended actions parameters can be handled by less expert users, because the balance of the rule has been delegated to the policy system. As in the minimum trust mode, the ITI for a given execution of the policy is computed based on the quality and quantity of changes. If recommended actions are accepted and applied unchanged, the ITI is 1. If modifications to the recommended actions are made, the ITI is assigned an amount specified by a pre-determined or expert-defined function of the amount of modification.

As the policy system evolves to a point where the OTI is sufficiently close to 1, the trust operating mode for a given policy can be adjusted upwards again to the next higher level of trust, i.e. the full trust mode. This adjustment can be made either automatically or manually. At the full trust mode, the user has relatively strong confidence in the policy and the policy system. When running in full trust mode, modifications to the recommended policy actions are not made. However, the system continues to monitor the overall OTI, and if the OTI falls below a pre-defined critical level, the policy system can revert to lower level trust modes for a given policy.

In the full trust or automatic mode, the policy system is given full authority to define and implement the actions for a particular policy without user intervention. User review of the executed actions, however, can still be provided. In one embodiment, a summary is generated for each policy execution, and the user examines this summary periodically. Based upon the examination, the user can decide whether or not to leave the system in full trust mode or to switch the system back to the partial trust mode or the minimal trust mode for a particular policy. Absent intervention from the user, an ITI of 1 is awarded for each policy execution. If the user decides to switch back to other modes of operation, ITI's of 0 are assigned, either for all policies, or if records suffice, for the policies which the user decided were unreliable, in sufficient numbers to drive the OTI for each policy to a level typical of the mode of operation to which the user switches the system. An OTI that is sufficiently close to 1 indicates that the user trusts the policy (and the policy system) to a high degree. In this phase of the operation, the user periodically examines the summary and allows the policy system to run autonomously.

In addition to the trust building tools described above, exemplary systems in accordance with the present invention can utilize more advanced learning techniques to modify system behavior, for example based upon the actions of the user in response to suggested actions, in order to obtain the trust of the user, e.g. to increase the OTI's. A variety of reinforcement learning algorithms can be used. Suitable available reinforcement techniques are described in L. P. Kaelbling, M. Littman, A. Moore, "Reinforcement Learning: A Survey", Journal of Artificial Intelligence Research, Volume 4, 1996, which is incorporated herein by reference in its entirety.

Figure 4:
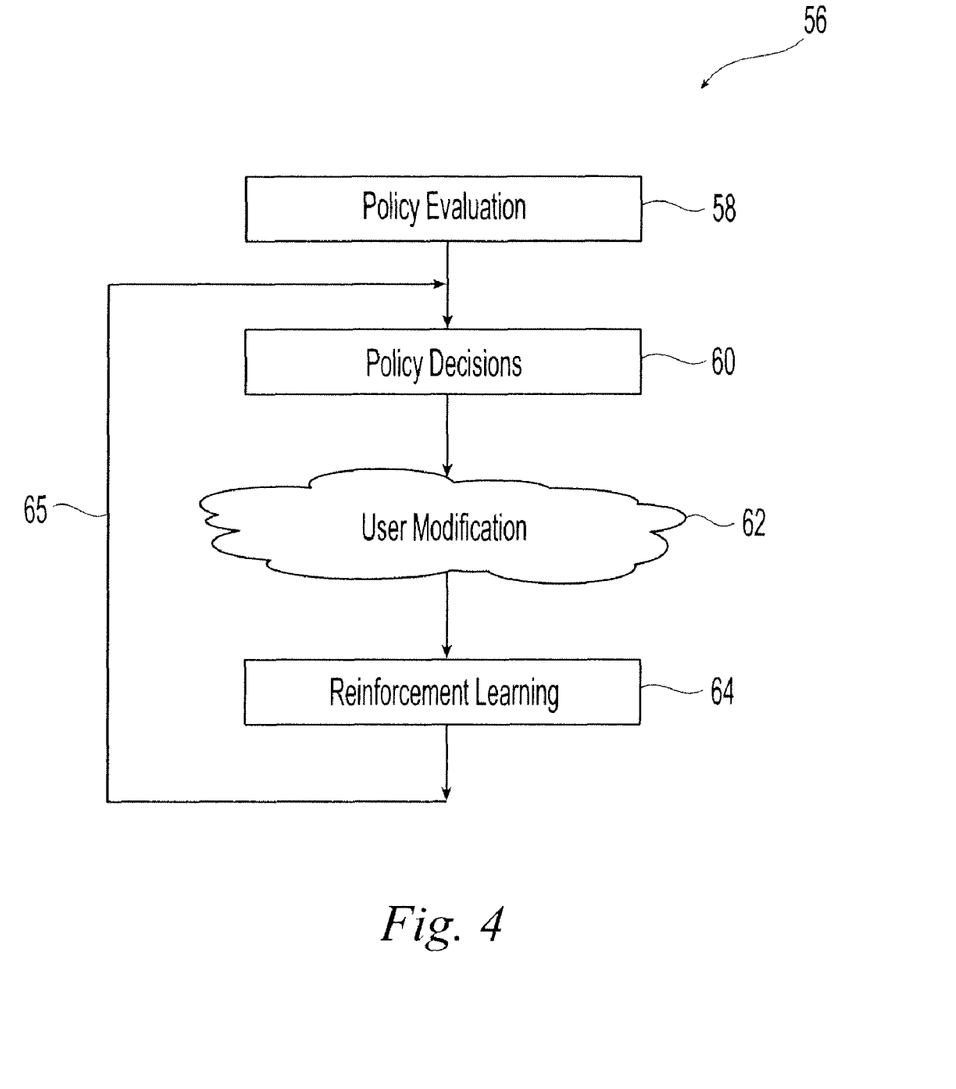
FIG. 4 is a flow chart illustrating an embodiment of a reinforcement learning feedback loop for use in accordance with the present invention.

Referring to FIG. 4, an exemplary embodiment of a reinforcement learning process as a feedback loop from information extracted from user interaction to the policy evaluation system 56 is illustrated. As illustrated, the policy evaluation system 58 generates policy decisions 60, for example in the form of recommended actions. In general, the recommended actions are selected so as to increase the level or trust between the user and the policy system. The recommended policy decisions may or may not be subject to user modifications 62, and a reinforcement learning system 64 monitors these modifications and provides an evaluation of these modifications back to the policy system in the form of a feedback loop 65. This feedback loop provides the evaluation of user modifications to the policy system for use in making policy decision recommendations. Therefore, the reinforcement learning evaluation is use to further increase the level of trust between the user and the policy system.

In one embodiment, a policy rule produces a set of recommended actions. In addition, new actions can be added by the system if the user overrides the recommended actions. Each recommended action has an associated action acceptance value (AAV) that is a number between 0 and 1. The AAV expresses the likelihood that a given recommended action will be accepted by the user. The AAV for each recommended action is adjusted through the reinforcement process so as to earn the highest possible reward from the user. For example, the policy system attempts to maximize the ITI by suggesting the actions with the highest AAV. A recommended action's AAV increases as it is selected by the user and decreases as it is deselected by the user.

In a data center serving multiple clients, for example, a load adjustment policy, which adjusts the loading of the information technology (IT) assets including servers, storage devices and switches based on client specified requirements and currently available assets, is running in minimum trust mode. The OTI is about 0.49 as calculated from 6 iterations of policy execution, and the threshold for advancing to the next trust mode is an OTI of ≧about 0.5. In response to a sudden increase in traffic across the network, the policy system recommends three actions, each action having an associated AAV. The first action is to deploy two additional servers. The second action is to increase buffer storage by 50% for certain group of clients, for example "GOLD" clients. The third action is to suspend processing of all batch jobs. Actions 1, 2, and 3 carry modification weights of 0.5, 0.3, and 0.2 respectively and AAV's of 0.9, 0.5, and 0.4 respectively. After examining the suggested actions, an administrator accepts actions 1 and 3 for execution. The ITI for this instance of policy execution is 0.7, where the ITI is the sum of the modification weights of each accepted action. This ITI is added to the computation of the OTI for the load adjustment policy, resulting in an OTI of 0.52, enabling advancement of the policy system to the partial trust mode. The AAV of action 2, which was not accepted, decreases to 0.4, and the AAV's of actions 1 and 3, which were accepted, increase to 1.0 and 0.5 respectively. This change in AAV's results in action 3 having a higher priority than action 2 as a candidates to be included in the recommended action list suggested by subsequent policy execution with similar conditions. Therefore, the policy system uses reinforcement learning to learn and to adjust actions to achieve a higher ITI. Therefore, systems and methods in accordance with exemplary embodiments of the present invention establish trust between the policy system and its user during active use of the policy system.

The present invention is also directed to a computer readable medium containing a computer executable code that when read by a computer causes the computer to perform a method for establishing and increasing trust between a user and a policy system in accordance with the present invention and to the computer executable code itself. The computer executable code can be stored on any suitable storage medium or database, including databases in communication with and accessible by any component used in accordance with the present invention, and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for incorporating user trust into a policy-based system, the method comprising:
   identifying a policy governing operational aspects of an application running on a computing system;
   creating recommended actions associated with the identified policy that are taken by the application to utilize assets of the computing system consistent with that policy;
   calculating a fraction of the recommended actions associated with the identified policy that are accepted and implemented unchanged;
   determining a level of trust associated with the identified policy as a function of the calculated fraction;
   using the determined level of trust to select an operational trust state that defines a level of autonomy with which the application utilizing the computing system assets in accordance with the identified policy operates; and
   running the application on the computing system in accordance with the selected operational trust state.

2. The method of claim 1, wherein the step of identifying the policy further comprises identifying a plurality of policies, each policy capable of governing operational aspects of the application, and the step of determining a level of trust further comprises determining a level of trust for all identified policies.

3. The method of claim 2, further comprising combining each level of trust from each identified policy into an overall trust level.

4. The method of claim 1. wherein the step of determining a level of trust further comprises determining a new level of trust upon each use of the policy to govern operational aspects of the application.

5. The method of claim 4, further comprising aggregating each new level of trust into an overall trust level.

6. The method of claim 5, wherein the step of using the determined level of trust further comprises using the overall trust level to dictate the operational trust state that defines the level of autonomy with which the policy operates to govern operational states of the application.

7. The method of claim 1, wherein the step of determining the level of trust further comprises identifying any modifications made to any of the policy recommended actions prior to implementation of the policy recommended actions to affect operational aspects of the application.

8. The method of claim 7, wherein the step of determining the level of trust further comprises calculating an instantaneous trust index using the identified modifications.

9. The method of claim 8, wherein the step of calculating the instantaneous trust index further comprises normalizing the instantaneous trust index to a value between zero and one.

10. The method of claim 7, wherein he step of identifying the modifications comprises identifying a quantity of modifications made, a quality of each modification made and combinations thereof.

11. A non-transitory computer readable storage medium containing a computer executable code that when read by a computer causes the computer to perform a method for incorporating user trust into a policy-based system, the method comprising:
   identifying a policy governing operational aspects of an application running on a computing system;
   creating recommended actions associated with the identified policy that are taken by the application to utilize assets of the computing system consistent with that policy;
   calculating a fraction of the recommended actions associated with the identified policy that are accepted and implemented unchanged;
   determining a level of trust associated with the identified policy as a function of the calculated fraction;
   using the determined level of trust to select an operational trust state that defines a level of autonomy with which the application utilizing the computing system assets in accordance with the identified policy operates; and
   running the application on the computing system in accordance with the selected operational trust state.

12. The non-transitory computer readable storage medium of claim 11, wherein the step of identifying the policy further comprises identifying a plurality of policies, each policy capable of governing operational aspects of the application, and the step of determining a level of trust further comprises determining a level of trust for all identified policies.

13. The non-transitory computer readable storage medium of claim 12 wherein the method further comprises combining each level of trust from each identified policy into an overall trust level.

14. The non-transitory computer readable storage medium of claim 11, wherein the step of determining a level of trust further comprises determining a new level of trust upon each use of the policy to govern operational aspects of the application.

15. The non-transitory computer readable storage medium of claim 14, wherein the method further comprises aggregating each new level of trust into an overall trust level.

16. The non-transitory computer readable storage medium of claim 15, wherein the step of using the determined level of trust further comprises using the overall trust level to dictate the operational trust state that defines the level of autonomy with which the policy operates to govern operational states of the application.

17. The non-transitory computer readable storage medium of claim 11, wherein the step of determining the level of trust further comprises identifying any modifications made to any of the policy recommended actions prior to implementation of the policy recommended actions to affect operational aspects of the application.

18. The non-transitory computer readable storage medium of claim 17, wherein the step of determining the level of trust further comprises calculating an instantaneous trust index using the identified modifications.

19. The non-transitory computer readable storage medium of claim 18, wherein the step of calculating the instantaneous trust index further comprises normalizing the instantaneous trust index to a value between zero and one.

20. The non-transitory computer readable storage medium of claim 17, wherein the step of identifying, the modifications comprises identifying a quantity of modifications made, a quality of each modification made and combinations thereof.

* * * * *